United States Patent
Trejo Sanchez et al.

(10) Patent No.: US 8,996,334 B2
(45) Date of Patent: Mar. 31, 2015

(54) METHOD AND SYSTEM FOR ANALYSIS OF TURBOMACHINERY

(75) Inventors: Adriana Elizabeth Trejo Sanchez, Queretaro (MX); Mohammad Waseem Adhami, Mason, OH (US); Jose Leon Vega Paez, Queretaro (MX); Monica Lizbeth Perez Gamboa, Queretaro (MX); Juan Paulo Chavez Valdovinos, Warsaw (PL)

(73) Assignee: General Electric Company, Schenectady, NY (US)

(*) Notice: Subject to any disclaimer, the term of this patent is extended or adjusted under 35 U.S.C. 154(b) by 910 days.

(21) Appl. No.: 13/039,286

(22) Filed: Mar. 2, 2011

(65) Prior Publication Data

US 2012/0226474 A1 Sep. 6, 2012

(51) Int. Cl.
*G06F 17/18* (2006.01)
*G05B 23/02* (2006.01)

(52) U.S. Cl.
CPC .................. *G05B 23/0275* (2013.01)
USPC ....................................... 702/179

(58) Field of Classification Search
CPC ....................................... G06F 17/18
USPC .................. 702/56, 58, 59, 90, 179, 182, 183
See application file for complete search history.

(56) References Cited

U.S. PATENT DOCUMENTS

| | | | |
|---|---|---|---|
| 6,260,004 B1 | 7/2001 | Hays et al. | |
| 6,330,525 B1 | 12/2001 | Hays et al. | |
| 6,408,259 B1 | 6/2002 | Goebel et al. | |
| 6,591,182 B1 | 7/2003 | Cece et al. | |
| 6,687,596 B2 | 2/2004 | Humerickhouse et al. | |
| 6,823,675 B2 | 11/2004 | Brunell et al. | |
| 7,089,154 B2 * | 8/2006 | Rasmussen et al. | 702/183 |
| 7,092,928 B1 * | 8/2006 | Elad et al. | 706/60 |
| 7,627,454 B2 | 12/2009 | LaComb et al. | |
| 8,405,339 B2 * | 3/2013 | Zhang et al. | 318/490 |
| 2003/0125906 A1 | 7/2003 | Guaglardi | |
| 2004/0148139 A1 | 7/2004 | Nguyen et al. | |
| 2004/0199573 A1 * | 10/2004 | Schwartz et al. | 709/201 |

(Continued)

FOREIGN PATENT DOCUMENTS

| | | |
|---|---|---|
| EP | 1643332 A2 | 4/2006 |
| EP | 1288644 B1 | 3/2007 |
| EP | 2068220 A1 | 6/2009 |
| EP | 2068220 A1 | 10/2009 |
| SG | 153036 A1 | 6/2009 |
| WO | 2007046816 A2 | 4/2007 |

OTHER PUBLICATIONS

Search Report and Written Opinion from EP Application No. 12157395.0 dated Oct. 16, 2012.
Search Report and Written Opinion from EP Application No. 12157395.0 dated Jul. 11, 2012.
U.S. Appl. No. 12/421,260, filed Apr. 9, 2009, Michael Graham et al., Unpublished.
European Search Report; 12157395.0; Jul. 1, 2012, pp. 1-5.

*Primary Examiner* — Mohamed Charioui
(74) *Attorney, Agent, or Firm* — Fletcher Yoder, P.C.

(57) ABSTRACT

A method and a system for analyzing turbomachinery is provided. In one embodiment, a system for analyzing turbomachinery is provided. The system includes an intelligent turbomachinery tracking filter (ITTF) system configured to determine one or more performance shifts for one or more components of the turbomachinery based on a plurality of turbomachinery parameters. The system further includes a root cause analyzer configured to determine a root cause of the turbomachinery performance based on the one or more performance shifts. The one or more performance shifts include trended data.

18 Claims, 4 Drawing Sheets

(56) References Cited

U.S. PATENT DOCUMENTS

| | | |
|---|---|---|
| 2005/0021212 A1 | 1/2005 | Gayme et al. |
| 2005/0049832 A1* | 3/2005 | Gorinevsky .................. 702/182 |
| 2005/0096873 A1* | 5/2005 | Klein .......................... 702/184 |
| 2005/0267702 A1 | 12/2005 | Shah et al. |
| 2006/0126608 A1 | 6/2006 | Pereira et al. |
| 2007/0288795 A1* | 12/2007 | Leung et al. .................... 714/26 |
| 2009/0048730 A1 | 2/2009 | Akkaram et al. |
| 2009/0150131 A1 | 6/2009 | Parthasarathy et al. |
| 2010/0161196 A1 | 6/2010 | Goericke et al. |
| 2012/0005532 A1* | 1/2012 | Li et al. .......................... 714/26 |

* cited by examiner

METHOD AND SYSTEM FOR ANALYSIS OF TURBOMACHINERY

BACKGROUND

The invention relates generally to turbomachinery, and more particularly to a method and system for analyzing the root cause of turbomachinery.

Turbomachinery may include an apparatus such as a turbine, a compressor, or a pump. As the turbomachinery operates, efficiency and performance may deteriorate over time. This degradation of performance may be due to various factors such as wear or component damage. Discovering the root cause of this degradation of performance may be useful in determining, for example, what type of maintenance should be performed on the turbomachinery so as to restore the turbomachinery to its original operating efficiency. However, the determination of the root cause of turbomachinery performance may require the stopping of turbomachinery operations followed by a visual analysis of the various turbomachinery components, which is inefficient and costly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system for analyzing turbomachinery is provided. The system includes an intelligent turbomachinery tracking filter (ITTF) system configured to determine one or more performance shifts for one or more components of the turbomachinery based on a plurality of turbomachinery parameters. The system further includes a root cause analyzer configured to determine a root cause of the turbomachinery performance based on the one or more performance shifts. The one or more performance shifts include trended data.

In a second embodiment, a method for analyzing a turbomachinery is provided. The method includes measuring a plurality of turbomachinery parameters, deriving a profile trend based on the plurality of turbomachinery parameters, and quantifying the profile trend to produce a quantified profile trend. The method further includes deriving a plurality of fuzzy values based on the quantified profile trend, and deriving a root cause analysis of the profile trend based on applying a rule and a model to the quantified profile trend.

In a third embodiment, a non-transitory machine readable media is provided. The non-transitory machine readable media includes instructions configured to process sensor data to identify a shift in turbomachinery performance and instructions configured to derive a profile trend based on the sensor data having the shift in turbomachinery performance. The non-transitory machine readable media further includes instructions configured to derive a first root cause of the shift in turbomachinery performance by applying fuzzy logic to the profile trend.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
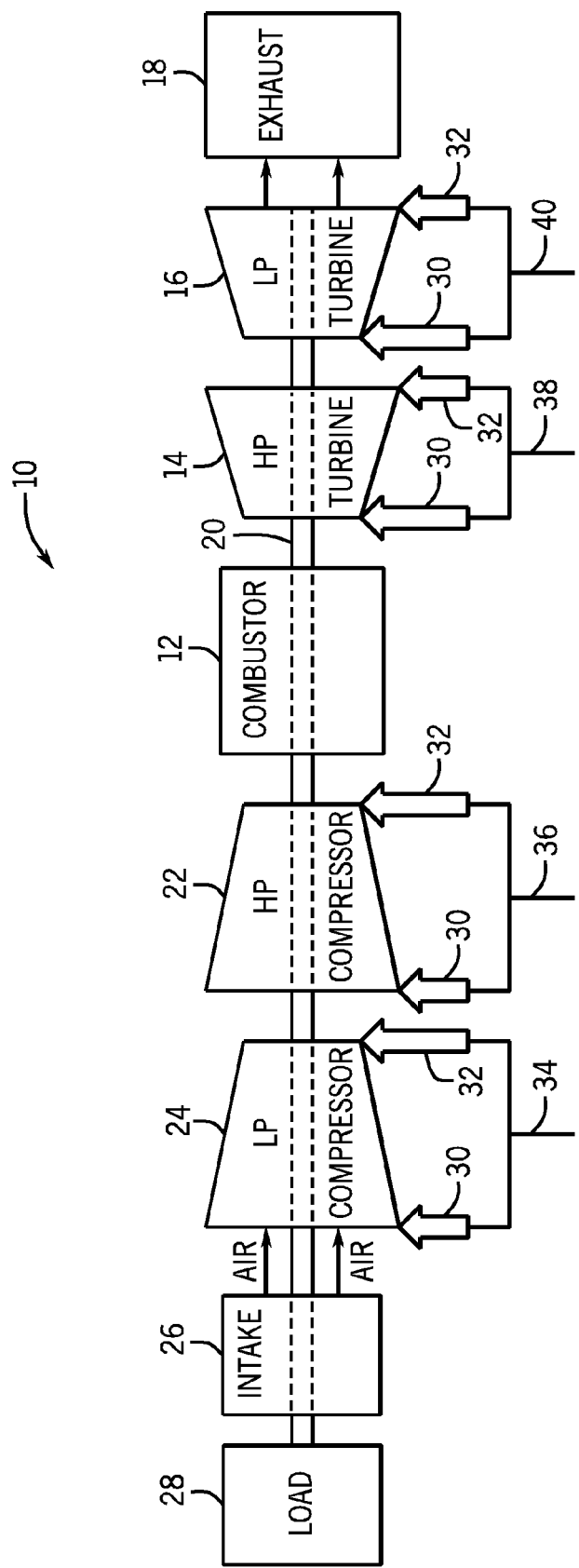
FIG. 1 is a block diagram of an embodiment of a turobomachinery.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Turbomachinery, such as a turbine engine, a compressor, or a pump, may undergo shifts in performance during operation. For example, the turbine engine may shift from operating at certain revolutions per minute (RPM) to operating at a lower or higher RPM without any changes made by an operator or controller for the turbine engine. The operational shifts (e.g., changes in RPM) of the turbomachinery may be attributed to certain conditions, such as worn components, unwanted changes in fuel composition (e.g., water in the fuel), unexpected maintenance events (e.g., blade cracks), and the like. In one embodiment, the turbomachinery may include a plurality of sensors suitable for measuring parameters such as temperature, vibration, speed, flow volume, pressure, and the like. The sensors may be communicatively connected to an intelligent turbomachinery tracking filter (ITTF). The ITTF may measure and analyze turbomachinery parameters corresponding to components of the turbomachinery, and detect shifts or changes in the turbomachinery parameters. In another embodiment, the measurements received from the plurality of sensors may be stored in a remote monitoring database, and the ITTF may then retrieve the measurements from the remote monitoring database for analysis and shift detection. These measurements may then be processed by the ITTF in order to derive a trend or timeline for each of the components of the turbomachinery. For example, the ITTF may derive one or more trends of parameters such as engine power, engine RPM, temperature, pressure, fuel consumption, exhaust flow, and the like.

The trends may then be analyzed by a root cause analyzer so as to determine a list of root causes for performance shifts, as described in more detail below with respect to FIGS. 1-5.

The list of root causes may be ordered by a probability of root cause. That is, each root cause determination may include a probability value denoting the probability that the root cause is the true or correct root cause of the measured trend. It is to be noted that more than one root cause may result in the performance shifts. For example, a dirty compressor and water in the fuel may lead to low power output in a turbine system. Indeed, multiple root causes may be derived. The root cause analyzer may also generate a recommendation that may enable the efficient rectification of a problem causing the shift or deviation by recommending specific modifications or repairs. By correcting the root cause of certain operational trends, turbomachinery that operates at less than an acceptable level of performance may be optimized to function a higher level of performance.

With the foregoing in mind, it may be useful to describe an embodiment of a turbomachinery incorporating techniques disclosed herein, such as a turbine system 10 illustrated in FIG. 1. The turbine system 10 may, for example, be manufactured by General Electric Company of Schenectady, N.Y., under the designation LM6000. As depicted, the turbine system 10 may include a combustor 12. The combustor 12 may receive fuel that has been mixed with air, for combustion in a chamber within combustor 12. This combustion creates hot pressurized exhaust gases. The combustor 12 directs the exhaust gases through a high pressure (HP) turbine 14 and a low pressure (LP) turbine 16 toward an exhaust outlet 18. The HP turbine 14 may be part of a HP rotor. Similarly, the LP turbine 16 may be part of a LP rotor. As the exhaust gases pass through the HP turbine 14 and the LP turbine 16, the gases force turbine blades to rotate a drive shaft 20 along an axis of the turbine system 10. As illustrated, drive shaft 20 is connected to various components of the turbine system 10, including a HP compressor 22 and a LP compressor 24.

The drive shaft 20 may include one or more shafts that may be, for example, concentrically aligned. The drive shaft 20 may include a shaft connecting the HP turbine 14 to the HP compressor 22 to form a HP rotor. The HP compressor 22 may include blades coupled to the drive shaft 20. Thus, rotation of turbine blades in the HP turbine 14 causes the shaft connecting the HP turbine 14 to the HP compressor 22 to rotate blades within the HP compressor 22. This compresses air in the HP compressor 22. Similarly, the drive shaft 20 includes a shaft connecting the LP turbine 16 to the LP compressor 24 to form a LP rotor. The LP compressor 24 includes blades coupled to the drive shaft 20. Thus, rotation of turbine blades in the LP turbine 16 causes the shaft connecting the LP turbine 16 to the LP compressor 24 to rotate blades within the LP compressor 24. The rotation of blades in the HP compressor 22 and the LP compressor 24 compresses air that is received via the air intake 26. The compressed air is fed to the combustor 12 and mixed with fuel to allow for higher efficiency combustion. Thus, the turbine system 10 may include a dual concentric shafting arrangement, wherein LP turbine 16 is drivingly connected to LP compressor 24 by a first shaft in the drive shaft 20, while the HP turbine 14 is similarly drivingly connected to the HP compressor 22 by a second shaft in the drive shaft 20 internal and concentric to the first shaft. Shaft 20 may also be connected to load 28, which may be a vehicle or a stationary load, such as an electrical generator in a power plant or a propeller on an aircraft. Load 28 may be any suitable device that is powered by the rotational output of turbine system 10.

The turbine system 10 may also include a plurality of sensors, configured to monitor a plurality of engine parameters related to the operation and performance of the turbine system 10. The sensors may include, for example, inlet sensors 30 and outlet sensors 32 positioned adjacent to, for example, the inlet and outlet portions of the HP turbine 14, the LP turbine 16, the HP compressor 22, and/or the LP compressor 24, respectively. The inlet sensors 30 and outlet sensors 32 may measure, for example, environmental conditions, such as ambient temperature and ambient pressure, as well as a plurality of engine parameters related to the operation and performance of the turbine system 10, such as, exhaust gas temperature, rotor speed, engine temperature, engine pressure, gas temperature, engine fuel flow, vibration, clearance between rotating and stationary components, compressor discharge pressure, pollution, and turbine exhaust pressure. Further, the sensors 30 and 32 may also measure actuator information such as valve position, and a geometry position of variable geometry components (e.g., air inlet). The plurality of sensors 30 and 32 may also be configured to monitor engine parameters related to various operational phases of the turbine system 10. Measurements taken by the plurality of sensors 30 and 32 may be transmitted via module lines 34, 36, 38, and 40. For example, module line 34 may be utilized to transmit measurements from the LP compressor 24, while module line 36 may be utilized to transmit measurements from the HP compressor 22. In a similar manner, module line 38 may be utilized to transmit measurements from the HP turbine 14, while module line 40 may be utilized to transmit measurements from the LP turbine 16. Thus, module lines 34, 36, 38, and 40 may transmit measurements from separate modules of the turbine system 10. The transmitted measurements may then be processed to determine any deviations from expected performance of the turbine system 10. By analyzing deviations in performance, the root cause(s) of such deviations may be identified and addressed, as described in more detail below.

Figure 2:
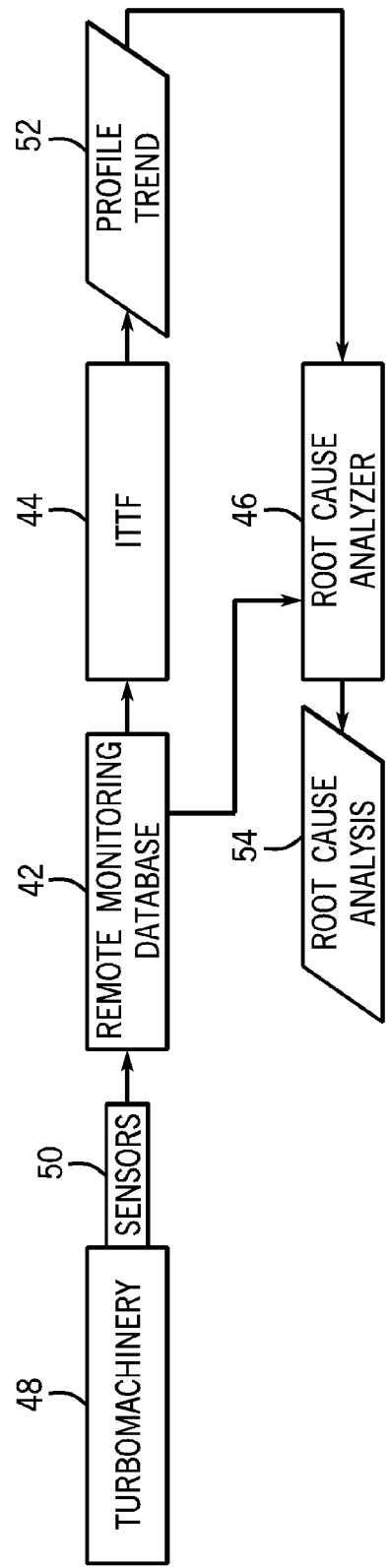
FIG. 2 is a block diagram of embodiments of a root cause analyzer system and an intelligent turbomachinery tracking filter (ITTF) system suitable for analyzing turbomachinery.

FIG. 2 is a block diagram depicting embodiments of a remote monitoring database 42, an ITTF 44, and a root cause analyzer 46 suitable for deriving root causes of changes in the operational performance of a turbomachinery 48. The turbomachinery 48 may be, for example, a turbine, a pump, a compressor suitable for transferring energy between a rotor and a fluid. The turbomachinery 48 may be, for example, the turbine system 10 described in more detail above with respect to FIG. 1. Alternatively, the turbomachinery 48 may be a steam turbine, a hydroturbine, or a wind turbine.

In certain embodiments, such as the illustrated embodiment, the turbomachinery 48 may include a multitude of sensors 50. The sensors 50 may include temperature sensors, pressure sensors, liquid level sensors, vibration sensors, fluid flow sensors, pollutant emission sensors, clearance sensors (e.g., spacing between rotating and stationary components), and the like. In the depicted embodiment, the measurements from the sensors 50 may be logged or stored in the remote monitoring database 42. The remote monitoring database 42 may be a relational database, a file, a distributed database, or any database suitable for storing and retrieving information. In certain embodiments, the measurements may be sampled at a certain sample rate, such as approximately every 250 milliseconds, 500 milliseconds, 1 second, or 10 seconds. It is to be understood that, additionally or alternatively, the sensors 50 may be directly connected to the ITTF 44 so as to enable real-time processing of the sensor 50 signals. That is, the ITTF 44 may directly process data received from the sensors 50 without having to retrieve data from the remote monitoring database 42. It is also to be understood that the remote monitoring database 42 may be queried directly by the root cause analyzer 46, as depicted. Additionally, the ITTF 44 and the root cause analyzer 46 may include non-transitory machine readable media storing code or computer instructions that may be used by a computing device to implement the techniques disclosed herein.

The ITTF 44 may utilize parameter identification techniques such as Kalman filtering, tracking filtering, regression mapping, neural mapping, inverse modeling techniques, or a combination thereof, to identify shifts in the data. The filtering may be performed by a modified Kalman filter, an extended Kalman filter, or other filtering algorithm, or alternatively, the filtering may be performed by proportional and integral regulators or other forms of square (n-inputs, n-outputs) or non-square (n-input, m-outputs) regulators. These filtering techniques may enable the identification of unexpected shifts in parameters of the turbomachinery 48. For example, if the turbomachinery 48 is a turbine system 10 (shown in FIG. 1), shutdown of the HP turbine 14 or the LP turbine 16 would typically result in an expected slow down of the rotational speed of the drive shaft 20. Unexpected trends, such as a slowdown followed by unexpected spikes in the speed of the drive shaft 20, may be detected by the ITTF 44 Likewise, an uneven air flow exiting the LP compressor 24 may be result in an unexpected shift of the air flow volume's measurement, and this shift may be detected by the ITTF 44. In another example, particulate matter deposited on blades, such as turbine engine blades or compressor blades may be detected.

Additionally, filtering techniques provided by the ITTF 44 may enable a reduction in the "noise" or errors in the data, thus producing improved estimates of the true values of the sensor 50 measurements. Further, the ITTF 44 may derive expected or predictive values based on historical data. For example, the ITTF 44 may predict an approximately upwardly sloping trend, a flat trend, and/or a downwardly sloping trend. The predicted trend may be compared against the actual trend, and the comparison may be used to detect unexpected shifts in performance. The ITTF 44 may then generate of a profile trend 52 for the turbomachinery 48 based on the detected shift in turbomachinery performance. The profile trend 52 may include, for example, all of the measurements received by the ITTF 44 and the data derived by the ITTF 44 to detect the shift in performance.

The profile trend 52 may be transmitted to the root cause analyzer 46 for further evaluation. In one embodiment, the root cause analyzer 46 may utilize, for example, a fuzzy logic engine, a physics-based model, a statistical model (such as a regression model or a neural network model), and/or a knowledge-based system (such as an expert system or an inference engine) to evaluate the profile trend 52, as described in more detail below with respect to FIG. 3. The root cause analyzer 46 may then produce a root cause analysis 54 detailing one or more sources of any shifts in performance. Additionally, the root cause analysis 54 may include a probability that the source of the performance shift was the true cause of the performance shift. Accordingly, the root cause analysis 54 may be used, for example, to focus inspection and/or maintenance activities on certain components of the turbomachinery. By enabling the determination of the root causes of performance shifts without having to stop operations of the turbomachinery, the disclosed embodiments may improve upon the utilization of the turbomachinery 48 and may lead to substantial reductions in downtime and required maintenance activities.

Figure 3:
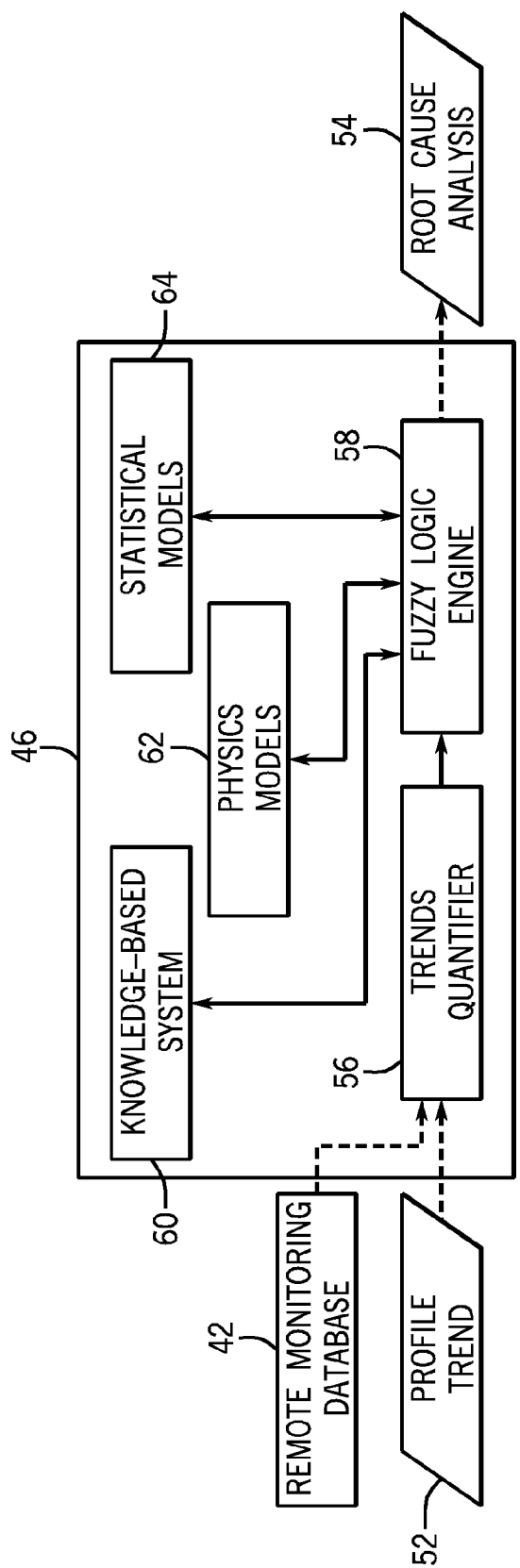
FIG. 3 is a block diagram of an embodiment of the root cause analyzer system of FIG. 2.

FIG. 3 is a block diagram illustrating an embodiment of the root cause analyzer of FIG. 2 suitable for processing the profile trend 52 to derive the root cause analysis 54. As mentioned above, the profile trend 52 may be derived to include one or more types of turbomachinery measurements such as temperature, vibration, speed, flow, pressure, fuel composition, pollution, clearance, geometry position, and/or actuator measurements (e.g., actuator position). The profile trend 52 may be first processed by a trends quantifier 56, for example, in order to quantify or measure trend values such as a trend slope or gradient (e.g., $\Delta x/\Delta y$), amount of "noise" in the trend data, amount of shifting in the trend (e.g., difference between expected values versus measured values), maximum values in the trend, and/or minimum values in the trend. The trends quantifier 56 may also query the remote monitoring database 42, for example, to retrieve sensor measurements stored in the database 42.

A fuzzy logic engine 58 may be used in conjunction with the trends quantifier 56, a knowledge-based system (KBS) 60, physics models 62, and statistical models 64 to derive the root cause analysis 54. The physics models 62 may include computational fluid dynamics (CFD) models, finite element analysis (FEA) models, solid models (e.g., parametric and non-parametric models), and/or 3-dimension to 2-dimension FEA mapping models. The physics models 62 may enable analysis of the profile trend 52 to ascertain correlative causation based on the mechanical and thermodynamic behavior of the turbomachinery 48. That is, the physics models 62 may be used to simulate the behavior of the turbomachinery 48 under physical conditions similar to those found in the profile trend 52, so as to identify components that may have become worn or be otherwise exhibiting lower performance. Accordingly, the physics models 62 may be used to find physical root causes of any shifts found in the profile trend 52.

The statistical models 64 may enable, for example, a statistical analysis suitable for inferring causation based on historical data. More specifically, data logged throughout the history of the turbomachinery 48, which may include data from a specific turbomachinery 48 (e.g., a specific unit of the turbine system 10) as well as from a fleet of turbomachinery 48 may be analyzed using statistical techniques suitable for deriving correlative relationships between the logged data and currently observed data. Any suitable correlative statistical technique may be used, such as correlation coefficients, distribution analysis (e.g., normal distribution, log-normal distribution, Pareto distribution), and/or correlation matrices. Further, the statistical analysis may be used to predict future values and trends in the behavior of the turbomachinery 48. For example, regression analysis (e.g., least square regression, linear regression, non-linear regression, multiple regression) may be used to predict future values based on the currently measured data. Additionally, statistical inferences techniques suitable for calculating a probability that a certain hypothesis is true (or false) may be used, such as Bayesian inference techniques. For example, the hypothesis may be formulated to calculate the probability that a certain component of the turbomachinery is underperforming. The use of the statistical models 64 enables historical data to be used in the determination of the root cause of current turbomachinery 48 trends.

The KBS 60 may be used to leverage subject matter expertise and/or experience related to the turbomachinery 48. For example, one or more rules (e.g., inference rules) may be used that represent knowledge gained through experience with the turbomachinery 48. To create the KBS rules, a knowledge engineer may conduct a series of interviews with subject matter experts and encode the experts' knowledge as rules organized in a knowledge base. The rules may be in the form of an "if . . . then . . . " conditional statement, such as, "if speed spikes occur every 10 seconds then a timing controller may be misfiring," or "if turbine fuel has an above average water content then startup time increases and startup temperatures decrease." Additionally to the knowledge base, the KBS 60 may include an inference engine (e.g., expert system) suitable for processing the knowledge rules and arriving at one or more diagnostic and/or prescriptive conclusions. For example, the inference engine may use the data in the profile trend 20 as inputs into the "if" conditional statements, and use the "then" clauses in the statements to arrive at one or more possible diagnostic and/or prescriptive conclusions. Indeed, by leveraging the use of expert knowledge, a more improved root cause analysis 54 may be derived.

The fuzzy logic engine 58 may be used to provide the root cause analyzer 46 with the capability to use approximate or fuzzy values mapped from precise values. For example, the KBS 60, the physics models 62, and the statistical models 64 may use fuzzy values such as "temperature_change=very_high" instead of a precise value, such as, "temperature_change=251° C.". The use of fuzzy values may improve the performance of the root cause analyzer 46, for example, through simplification of the design and implementation of the root cause analyzer 46. Indeed, by using simpler fuzzy logic techniques as compared to more complex mathematical constructs (e.g., differential equations), the fuzzy logic engine 58 enables the implementation of fuzzy models and rules suitable for describing complex systems, such as the turbomachinery 48 of FIG. 2.

The KBS 60, the physics models 62, the statistical models 64 may use the fuzzy logic engine 58 as a calculation engine suitable for using fuzzy values in calculations. That is, instead of performing all calculations using precise values, the fuzzy logic engine may enable the KBS 60, the physics models 62, the statistical models 64 to perform calculations using fuzzy values and fuzzy rules. By using fuzzy models, rules, and values, the root cause analyzer 46 may enable a more accurate and faster derivation of the root cause analysis 54.

Figure 4:
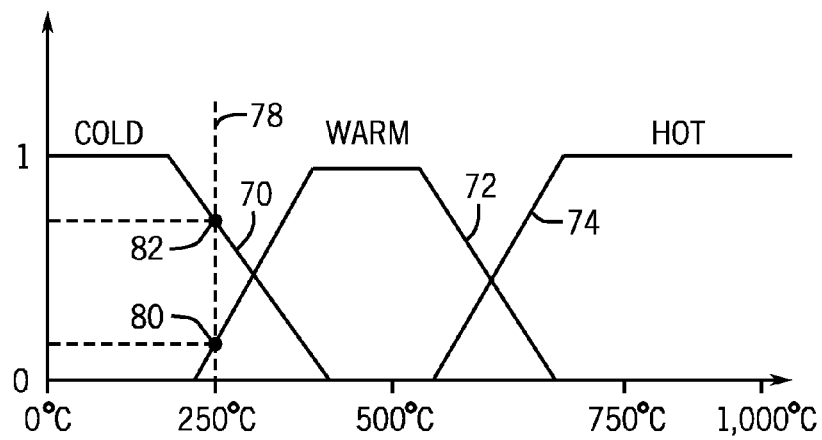
FIG. 4 is a diagram of embodiments of fuzzy logic values.

FIG. 4 illustrates an embodiment of fuzzy values or functions 70, 72, and 74 suitable for use by the root cause analyzer shown in FIG. 2. In the depicted embodiment, the values 70, 72, and 74 correspond to temperatures values such as cold, warm, and hot, respectively. These values 70, 72, and 74 may be representative of the operating temperatures of a turbine system such as the turbine system 10 shown in FIG. 1. It is to be understood that other types of fuzzy values may be used, such as values based on vibration, pressure, flow, fuel, speed, clearance, pollution, actuator position, geometry position, and so on. In the depicted embodiment, a temperature range disposed on the X-axis may be used as a basis for mapping a specific operating temperature to one of the fuzzy values 70, 72, and/or 74 and may also be used to assign a degree of truth to the values 70, 72, and 74. In one embodiment, the truth value defines a degree of truth for the fuzzy values 70, 72, and 74. In this embodiment, the degree of truth may be restricted to a range from 0 to 1 where 0 denotes that the fuzzy value is completely false and 1 denotes that the fuzzy value is completely true.

For example, if the specific operating temperature is 250° C., the value may be mapped by using a vertical line 78 disposed on the X-axis at 250° C. to locate the points 80 and 82 that intersect the fuzzy values 70 and 72 (e.g., cold and warm). The ordinate values of the intersecting points 80 and 82 may then be used to represent the degree of truth that the operating temperature of 250° C. is cold and warm. In the depicted example, the degree of truth that the operating temperature is cold is approximately 0.6 (i.e., 60%), and the degree of truth that the operating temperature is warm is approximately 0.125 (i.e., 12.5%). Since the line 78 does not intersect any portion of the value 74, then the degree of truth that the operating temperature is hot is set to approximately 0.

Accordingly, a precise temperature measurement may be converted into fuzzy values 70, 72, and 74, which may then be used by the fuzzy logic engine 58 in conjunction with the KBS 60, the physics models 62, and the statistical models 64 to derive the root cause analysis 54.

Figure 5:
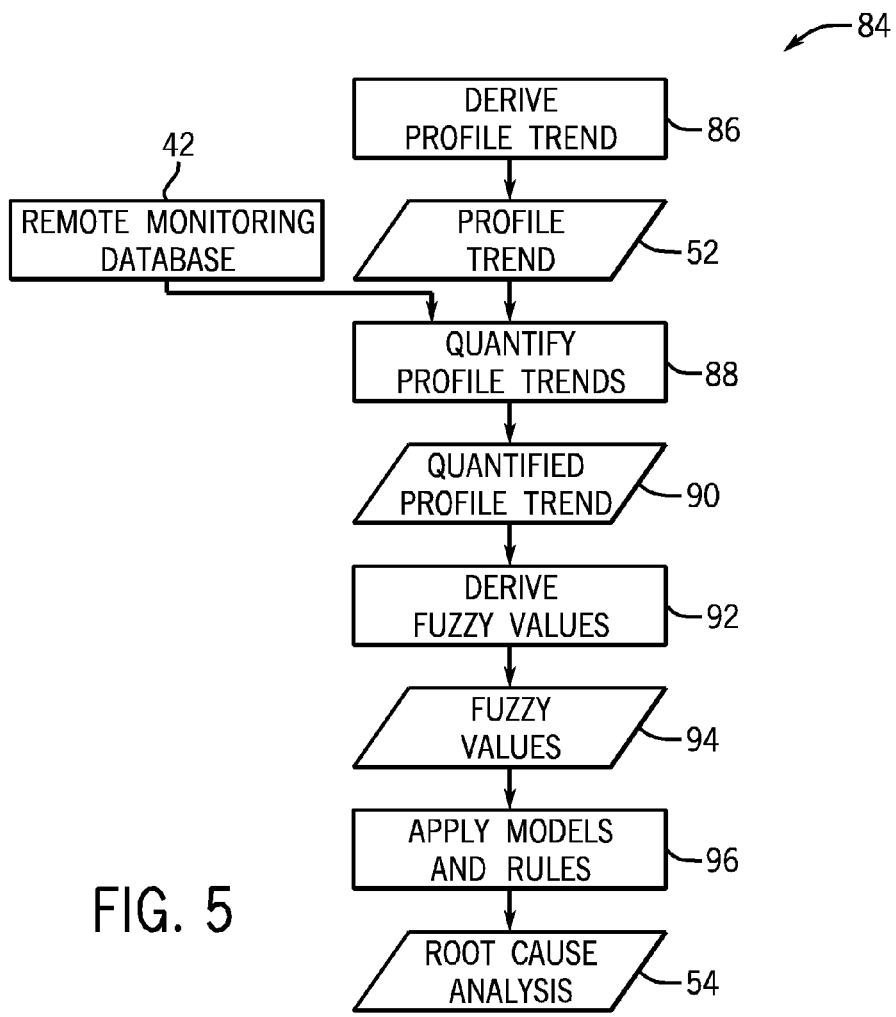
FIG. 5 is a flow chart of an embodiment of a logic suitable for analyzing the root cause of turbomachinery performance.

FIG. 5 illustrates an embodiment of a logic 84 that may be used for deriving the root cause analysis 54. The logic 84 may be stored in a non-transitory machine readable media as computer instructions and may be used by a computing device to implement the techniques disclosed herein. The logic 84 may first derive the profile trend 52 (block 86). The derivation of the profile trend 52 may include collecting sensor measurements, such as temperature measurements, pressure measurements, vibration measurements, flow measurements, fuel measurements, actuator measurements, pollution measurements, clearance measurement, geometry position measurements, and the like. The collected measurements may then be used, for example, by the ITTF 44 shown in FIG. 2 to derive the profile trend 52. The profile trend 52 may then be quantified (block 88) as described above with respect to the trends quantifier 56 of FIG. 3. For example, the trends quantifier 56 may process and quantify the values in the profile trend 52 to include parameters such as trend slope or gradient, amount of "noise" in the trend data, amount of shifting in the trend, maximum values in the trend, and/or minimum values in a quantified profile trend 90. The trend quantifier 56 may also query the remote monitoring database 42 to retrieve, for example, stored sensor 50 measurements. It is to be noted that the quantified profile trend 90 may also include all of the parameters processed and calculations derived by the ITTF 44, including all sensor 50 measurements.

The logic 84 may then derive one or more fuzzy values (block 92) based on the quantified profile trend 90. For example, fuzzy values 94 such as "HP_turbine_temperature_change=high," "LP_turbine_temperature_change=low," "measurement_error=very_small," and "variable_inlet_guide_vane=fully_open" may be derived by based on the measured parameters of the quantified profile trend 90. In one embodiment, each of the parameters in the quantified profile trend 90 may be compared against expected changes in the parameters so as to derive the fuzzy values 94. Additionally, a degree of truth may be assigned to the fuzzy values. In this way, a variety of fuzzy values 94 may be derived, including values related to all components of the turbomachinery 48.

The logic 84 may then apply models and rules (block 96) to the fuzzy values so as to derive the root cause analysis 54. In one embodiment, the logic 84 may use the fuzzy logic engine 58 to apply the models and rules (e.g., physics models 62, statistical models 64, and KBS 60 rules) (block 96). For example, in one embodiment, the fuzzy logic engine 58 may be used in conjunction with the KBS to 60 "fire" (i.e., execute or run) rules based on certain of the fuzzy values, resulting in the derivation of new fuzzy values. In turn, these newly derived fuzzy values may result in the "firing" of additional fuzzy rules, and so on. This "forward chaining" approach may enable the automatic inferencing of one or more root causes. That is, by successively inferencing or deriving new data based on previously derived conditions, the logic 84 may reach a conclusion that one or more root causes may give rise to the measured trends. For example, the root causes may include a variety of component and component issues such as "dirty_compressor=somewhat_dirty," "compressor_leak=slight_leak," "variable_inlet_guide_vane=stuck", "LP_turbine_first_stage_blade=cracked," and so forth. It is to be understood that the list of component and component issues may be very long, in certain instances, hundreds or thousands of items may be found in such lists.

In another embodiment, "backward chaining" may be used, in which the logic 84 works backwards from a list of all possible root causes to determine how much of the data supports the determinations that certain root causes are responsible for the current set of measurements. The physics models 62 and the statistical models 64 may also be used. For example, further root cause estimations may be found by applying the models 62 and 64 to the data and/or fuzzy values. The physics models 62 may be useful in analyzing physics-based root causes of certain data trends while the statistical models 64 may be useful in comparing the data trends against historical information in order to derive a list of possible root causes. In this way, the root cause analysis 54 may be created by listing all of the root causes found. Additionally, each root cause in the root cause analysis may include a probability of correctness or of accuracy. The probability may be derived based on a match of parameters. For example, for KBS 60 rules, the number of parameters matching the "if" or conditional side of the rules may be used to derive the probability. In another example, the number of parameters matching the physics models 62 and the statistical models 64 may be used. In this example, if a first physics model 62 has more matched parameters than a second physics model 62, then the first physics model 62 may have a higher probability than the second physics model. It is to be understood that the matching may include percentage matching as well as weighted matching. In percentage matching, the probability measure is based on a number of matching parameters divided by the total number of parameters of a model (or set of rules). In weighted matching, certain matching parameters may be given more weight over other matching parameters when deriving the probability.

Each of the root causes in the root cause analysis 54 may be ranked by the estimated probability that the root cause is the actual root cause (or one of multiple root causes) of any performance shifts. Indeed, the logic 84 may rank root causes based on their respective probabilities so that the higher ranked root causes may be further investigated. The probabilities may be used, for example, to more efficiently guide maintenance activities. Maintenance schedules may be created based on root causes having higher probabilities. Likewise, maintenance resources, such as personnel and equipment, may be more efficiently directed to investigate the higher probability root causes. By providing for a root cause analysis 54, the logic 84 may improve the operational efficiency of the turbomachinery 48 and reduce cost.

Technical effects of the invention include the detection of performance shifts during operations of a turbomachinery such as a turbine system, a pump, and/or a compressor. Further technical effects include the derivation of one or more root causes of the performance shifts by using a root cause analyzer. The root cause analyzer may include fuzzy logic techniques suitable for simplifying the design and implementation the root cause analyzer when compared to using complex mathematical constructs such as differential equations. The root cause analyzer may be suitable for describing complex turbomachinery systems and deriving one or more root causes of the performance shifts. Each of the root causes may be assigned a probability based on turbomachinery parameters used in determining the root cause. The root cause analyzer may derive a root cause analysis which may include all of the root causes of the performance shift, and the root causes may be ranked by their probability. The root cause analysis may be used to optimally repair, maintain, and operate the turbomachinery.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for analyzing turbomachinery comprising:
an intelligent turbomachinery tracking filter (ITTF) system configured to determine one or more performance shifts for one or more components of a turbomachinery based on a plurality of the turbomachinery parameters; and
a root cause analyzer configured to determine a root cause of a turbomachinery performance based on the one or more performance shifts, wherein the one or more performance shifts comprise trended data, wherein the root cause analyzer is configured to derive a probability of accuracy of the root cause, and wherein the root cause analyzer comprises a trend quantifier configured to quantify the one or more performance shifts by measuring a maximum value and a minimum value in the one or more of the performance shifts to derive one or more quantified performance shifts.

2. The system of claim 1, wherein the root cause analyzer comprises a fuzzy logic-based engine configured to process the one or more performance shifts using fuzzy logic.

3. The system of claim 1, wherein the root cause analyzer comprises a physics model configured to model a mechanical behavior of the turbomachinery, a thermodynamic behavior of the turbomachinery, or a combination thereof.

4. The system of claim 1, wherein the root cause analyzer comprises a statistical model configured to model historical trends of the turbomachinery.

5. The system of claim 1, wherein the root cause analyzer comprises a knowledge-based system (KBS) having a plurality of knowledge rules, wherein the plurality of knowledge rules are configured to capture knowledge of a subject matter expert on the turbomachinery.

6. The system of claim 5, wherein the KBS comprises a forward chaining system, a backward chaining system, or a combination thereof.

7. The system of claim 1, wherein the turbomachinery comprises at least one of a turbine system, a pump, or a compressor.

8. The system of claim 1, wherein the turbomachinery parameters comprise at least one of a temperature, a vibration, a speed, a flow, a pressure, a fuel measure, a pollution measure, a geometry position, a clearance or an actuator position.

9. A method for analyzing a turbomachinery comprising:
sensing in real-time, via an intelligent turbomachinery tracking filter (ITTF) system communicatively coupled to the turbomachinery, a plurality of sensor signals;
measuring, via the ITTF system, a plurality of turbomachinery parameters by transforming the plurality of sensor signals into the plurality of turbomachinery parameters;

deriving, via the ITTF system, one or more one or more performance shifts for one or more components of the turbomachinery based on the measured turbomachinery parameters;

deriving, via the ITTF system, a profile trend based on the one or more performance shifts;

quantifying, via the ITTF system, the profile trend to produce a quantified profile trend;

deriving, via the ITTF system, a plurality of fuzzy values based on the quantified profile trend; and deriving, via a root cause analyzer system, a root cause of a turbomachinery performance based on the one or more performance shifts via executing a root cause analysis instructions, wherein the root cause analysis instructions comprise instructions for deriving a probability of accuracy of the root cause, and wherein the root cause analysis instructions comprise instructions for executing a trend quantifier analysis configured to quantify the one or more performance shifts by measuring a maximum value and a minimum value in the one or more of the performance shifts to derive the one or more quantified performance shifts.

10. The method of claim 9, wherein deriving the one or more performance shifts comprises detecting a shift in the quantified profile trend relative to an expected value.

11. The method of claim 10, wherein detecting the shift comprises a Kalman filtering, a tracking filtering, a regression mapping, a neural mapping, an inverse modeling, or a combination thereof, of the measured parameters.

12. The method of claim 9, wherein the quantifying the profile trend to produce a quantified profile trend comprises deriving a slope in the measured parameters, deriving an amount of noise in the measured parameters, or a combination thereof.

13. The method of claim 9, wherein deriving the plurality of fuzzy values comprises mapping a precise value and assigning a degree of truth.

14. The method of claim 9, comprising applying a knowledge based system rule to the quantified profile trend and applying at least one of a physic model or a statistical model to the quantified profile trend to derive the one or more performance shifts.

15. A non-transitory machine readable media, comprising:
instructions configured to process sensor data to identify one or more performance shifts in turbomachinery performance via an intelligent turbomachinery tracking filter (ITTF) system communicatively coupled to a turbomachinery;

instructions configured to derive, via the ITTF system, a profile trend based on the sensor data having the one or more performance shifts in turbomachinery performance;

instructions configured to derive, via the ITTF system, a first root cause of the one or more performance shifts in turbomachinery performance by applying fuzzy logic to the profile trend; and instructions configured to perform, via a root cause analyzer system, a root cause analysis to derive a probability that the first root cause has been accurately identified, wherein the root cause analysis comprises a trend quantifier analysis configured to quantify the one or more performance shifts by measuring a maximum value and a minimum value in the one or more of the performance shifts to derive the one or more quantified performance shifts.

16. The non-transitory machine readable media of claim 15, wherein the instructions configured to derive, via the root cause analyzer system, the first root cause of the one or more performance shifts in the turbomachinery performance by applying the fuzzy logic comprise instructions for mapping a precise value to a fuzzy value.

17. The non-transitory machine readable media of claim 15, wherein the instructions configured to derive, via the root cause analyzer system, the first root cause of the one or more performance shifts in the turbomachinery performance by applying the fuzzy logic comprise instructions for applying a knowledge based system rule, a physics model, a statistical model, or a combination thereof.

18. The non-transitory machine readable media of claim 15, comprising instructions configured to derive, via the root cause analyzer system, a second root cause of the one or more performance shifts in turbomachinery performance by applying fuzzy logic to the profile trend, and comprising instructions configured to rank the first and the second root causes by assigning a first probability to the first root cause and a second probability to the second root cause, and ranking the first and the second root causes by comparing the first and second probabilities.

* * * * *